US012566422B2

(12) United States Patent
Liu

(10) Patent No.: US 12,566,422 B2
(45) Date of Patent: Mar. 3, 2026

(54) MACHINING PROGRAM EDITING ASSIST DEVICE

(71) Applicant: FANUC CORPORATION, Yamanashi (JP)

(72) Inventor: Zhaojia Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 510 days.

(21) Appl. No.: 18/012,774

(22) PCT Filed: Jul. 20, 2021

(86) PCT No.: PCT/JP2021/027088
§ 371 (c)(1),
(2) Date: Dec. 23, 2022

(87) PCT Pub. No.: WO2022/024863
PCT Pub. Date: Feb. 3, 2022

(65) Prior Publication Data
US 2023/0315045 A1 Oct. 5, 2023

(30) Foreign Application Priority Data
Jul. 27, 2020 (JP) ................................. 2020-126561

(51) Int. Cl.
*G05B 19/4097* (2006.01)
(52) U.S. Cl.
CPC ..................... *G05B 19/4097* (2013.01); *G05B 2219/35134* (2013.01)
(58) Field of Classification Search
CPC ...... G05B 19/4097; G05B 2219/35134; G05B 2219/35304; G05B 2219/36041; G05B 19/409; Y02P 90/02
See application file for complete search history.

(56) References Cited

U.S. PATENT DOCUMENTS

2008/0109097 A1* 5/2008 Takahashi ........ G05B 19/40937
700/98
2014/0107831 A1* 4/2014 Abe ................... G05B 19/4097
700/182
(Continued)

FOREIGN PATENT DOCUMENTS

CN 105302929 A 2/2016
JP H06-131023 A 5/1994
(Continued)

OTHER PUBLICATIONS

International Search Report issued Oct. 12, 2021, in International (PCT) Application No. PCT/JP2021/027088, with English translation.

*Primary Examiner* — Christopher E. Everett
(74) *Attorney, Agent, or Firm* — Wenderoth, Lind & Ponack, L.L.P.

(57) ABSTRACT

A machining program editing assist device includes a CAD data analysis unit which analyzes CAD data of a workpiece after a change, and acquires CAD shape information about the workpiece after the change, and a machining program analysis unit which analyzes a machining program before the change, and acquires machining shape information about the workpiece before the change. The device also includes an input shape prediction unit which acquires predicted shape information by performing shape matching between the CAD shape information and the machining shape information before the change, and specifying a modified shape, and an NC program auto-generation unit which, based on the predicted shape information, inserts a machining route that is existing only in the CAD data into the machining program, and deletes a machining route that is present only in the machining program from the machining program.

4 Claims, 25 Drawing Sheets

(56) References Cited

U.S. PATENT DOCUMENTS

| 2014/0172151 | A1* | 6/2014 | Niwa | G05B 19/4068 |
| | | | | 700/186 |
| 2015/0362310 | A1* | 12/2015 | Taniguchi | G05B 19/401 |
| | | | | 356/4.01 |
| 2016/0011583 | A1* | 1/2016 | Matsubara | G05B 19/4093 |
| | | | | 700/181 |
| 2016/0077518 | A1* | 3/2016 | Matsubara | G05B 19/4097 |
| | | | | 700/159 |
| 2021/0041851 | A1* | 2/2021 | Liu | G05B 19/4097 |
| 2021/0063998 | A1* | 3/2021 | Liu | G05B 19/4097 |
| 2022/0253034 | A1* | 8/2022 | Tsuchiya | B23C 5/00 |

FOREIGN PATENT DOCUMENTS

| JP | 09-044222 | | 2/1997 |
| JP | 2002-326175 | | 11/2002 |
| JP | 2002-334121 | A | 11/2002 |
| JP | 2010-267169 | | 11/2010 |
| JP | 2016-083730 | | 5/2016 |

* cited by examiner

FIG. 2

[EXISTING PROGRAM]

```
G83  X_Y_;  HOLE POSITION P1
X_Y_;  HOLE POSITION P2
X_Y_;  HOLE POSITION P3
. . .
X_Y_;  HOLE POSITION PM

G72  P1Q(M+1);
N1  G00Z_;
N2  G01X_W_;  ELEMENT E1
N3  X_W_;  ELEMENT E2
N4  X_W_;  ELEMENT E3
. . .
N(M+1)G03 X_W_R_;  ELEMENT EM
```

FIG. 3

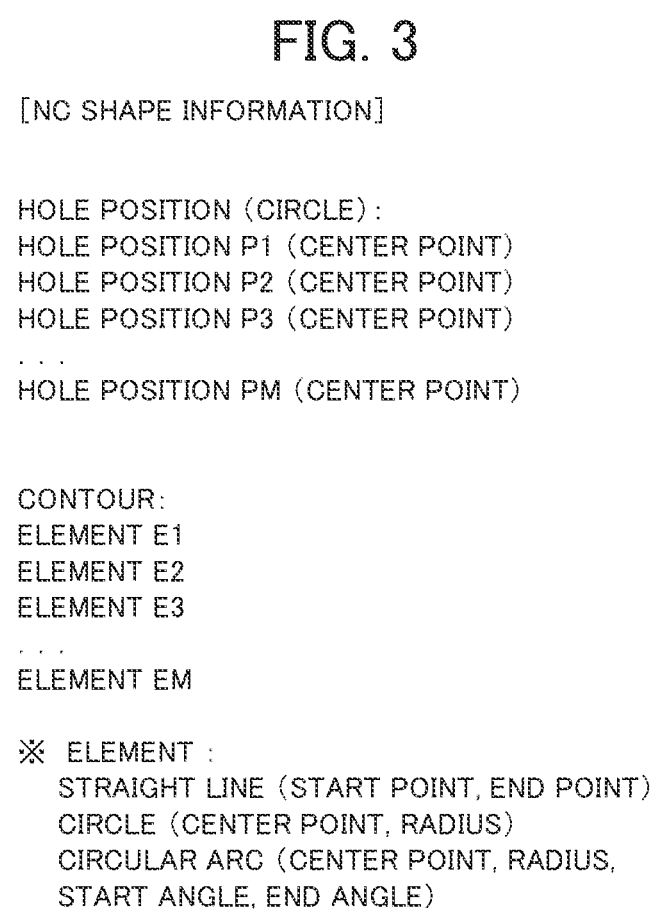

[NC SHAPE INFORMATION]

HOLE POSITION (CIRCLE):
HOLE POSITION P1 (CENTER POINT)
HOLE POSITION P2 (CENTER POINT)
HOLE POSITION P3 (CENTER POINT)
. . .
HOLE POSITION PM (CENTER POINT)

CONTOUR:
ELEMENT E1
ELEMENT E2
ELEMENT E3

. . .
ELEMENT EM

※  ELEMENT :
    STRAIGHT LINE (START POINT, END POINT)
    CIRCLE (CENTER POINT, RADIUS)
    CIRCULAR ARC (CENTER POINT, RADIUS,
    START ANGLE, END ANGLE)

FIG. 4

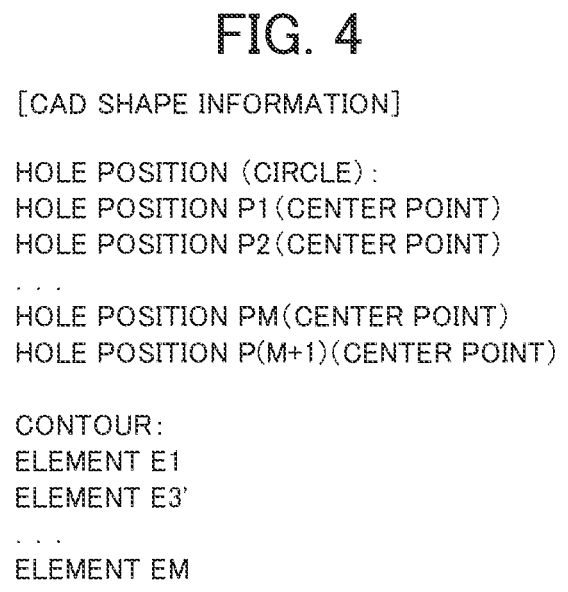

[CAD SHAPE INFORMATION]

HOLE POSITION (CIRCLE):
HOLE POSITION P1(CENTER POINT)
HOLE POSITION P2(CENTER POINT)
. . .
HOLE POSITION PM(CENTER POINT)
HOLE POSITION P(M+1)(CENTER POINT)

CONTOUR:
ELEMENT E1
ELEMENT E3'
. . .
ELEMENT EM

FIG. 5

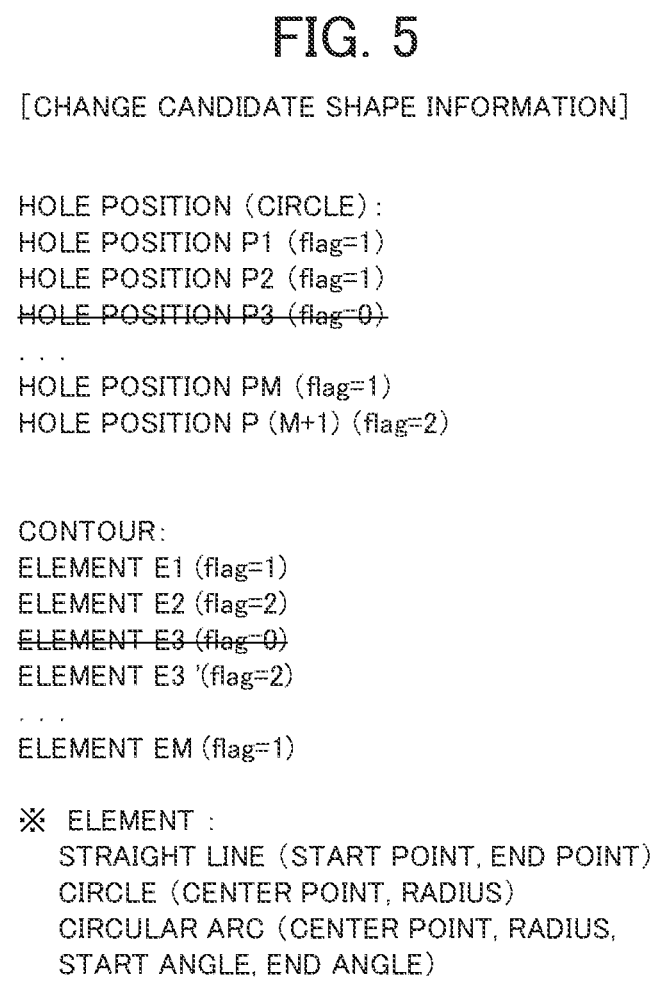

[CHANGE CANDIDATE SHAPE INFORMATION]

HOLE POSITION (CIRCLE) :
HOLE POSITION P1 (flag=1)
HOLE POSITION P2 (flag=1)
~~HOLE POSITION P3 (flag=0)~~

. . .

HOLE POSITION PM (flag=1)
HOLE POSITION P (M+1) (flag=2)

CONTOUR:
ELEMENT E1 (flag=1)
ELEMENT E2 (flag=2)
~~ELEMENT E3 (flag=0)~~
ELEMENT E3 '(flag=2)

. . .

ELEMENT EM (flag=1)

※ ELEMENT :
STRAIGHT LINE (START POINT, END POINT)
CIRCLE (CENTER POINT, RADIUS)
CIRCULAR ARC (CENTER POINT, RADIUS,
START ANGLE, END ANGLE)

FIG. 6

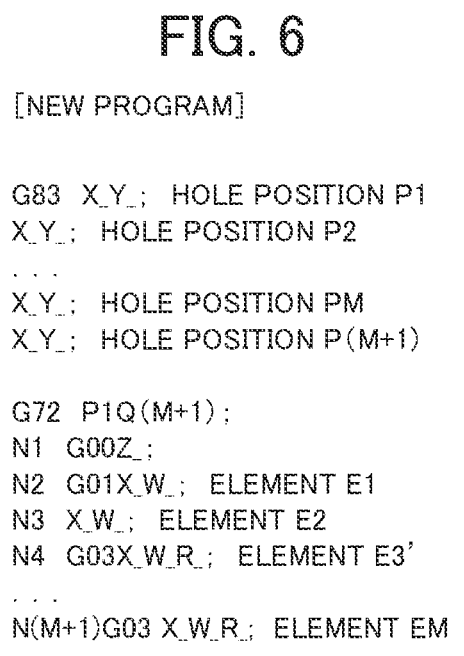

[NEW PROGRAM]

G83  X_Y_;  HOLE POSITION P1
X_Y_;  HOLE POSITION P2

. . .

X_Y_;  HOLE POSITION PM
X_Y_;  HOLE POSITION P(M+1)

G72  P1Q(M+1);
N1  G00Z_;
N2  G01X_W_;  ELEMENT E1
N3  X_W_;  ELEMENT E2
N4  G03X_W_R_;  ELEMENT E3'

. . .

N(M+1)G03 X_W_R_;  ELEMENT EM

FIG. 7A

```
//CNC_NEW/USER/PAINT/
DEMO
```

```
<DEMO>
G28 U0 W0;
T01;
G00 X120. Z20;
G83 X500.0 Y1000.0 Z-10.0 R-10.0 Q15.0 F80.0 ;
X520.0  Y965.4 ;
X540.0  Y930.8 ;
X560.0  Y896.2 ;
X525.4  Y876.2 ;
X505.4  Y910.8 ;
X485.4  Y945.4 ;
X460.4  Y980.0 ;
X-500.0 Y1000.0;
```

FIG. 7B

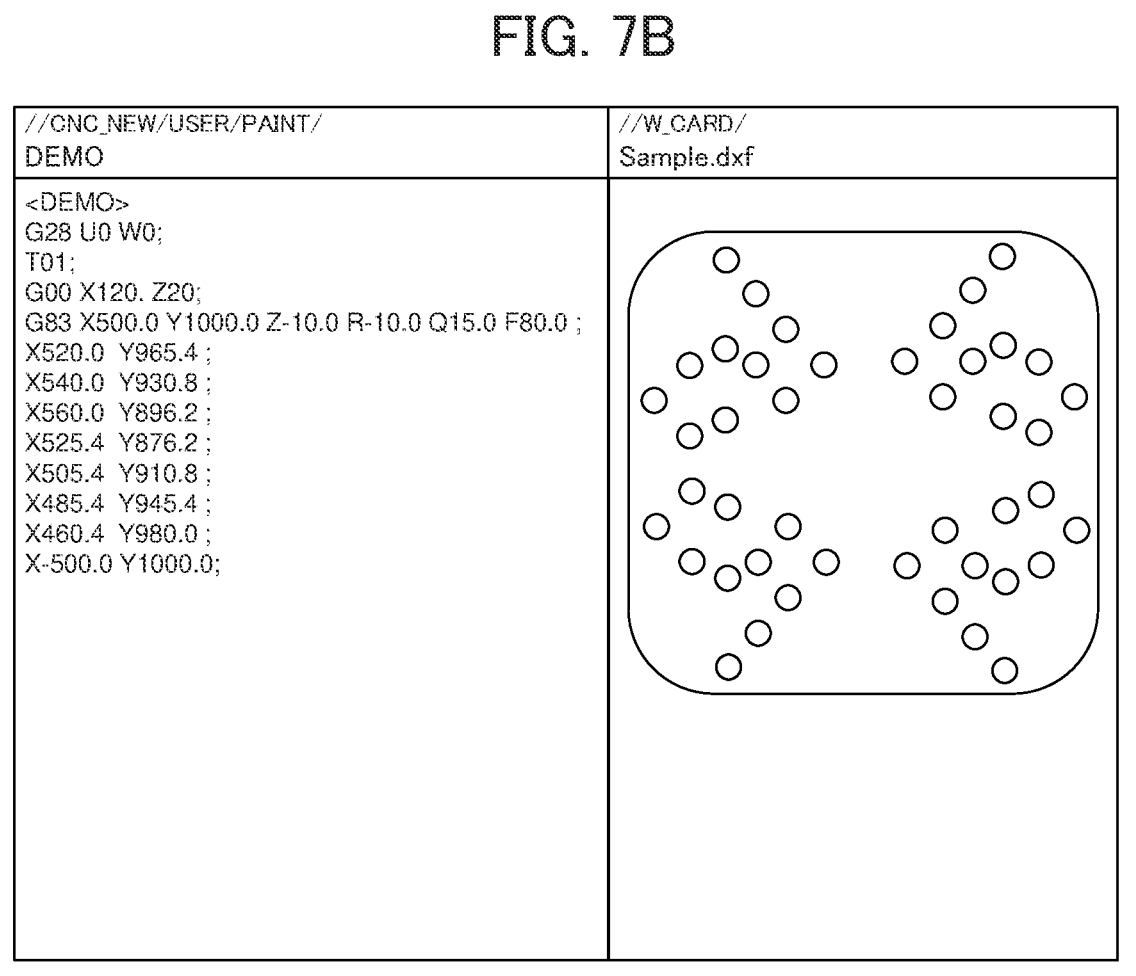

| //CNC_NEW/USER/PAINT/<br>DEMO | //W_CARD/<br>Sample.dxf |
|---|---|
| <DEMO><br>G28 U0 W0;<br>T01;<br>G00 X120. Z20;<br>G83 X500.0 Y1000.0 Z-10.0 R-10.0 Q15.0 F80.0 ;<br>X520.0  Y965.4 ;<br>X540.0  Y930.8 ;<br>X560.0  Y896.2 ;<br>X525.4  Y876.2 ;<br>X505.4  Y910.8 ;<br>X485.4  Y945.4 ;<br>X460.4  Y980.0 ;<br>X-500.0 Y1000.0; | |

FIG. 7C

| //CNC_NEW/USER/PAINT/<br>DEMO | //W_CARD/<br>Sample.dxf |
|---|---|
| T01;<br>G00 X120. Z20;<br>G83 X500.0 Y1000.0 Z-10.0 R-10.0 Q15.0 F80.0 ;<br>X520.0  Y965.4 ;<br>X540.0  Y930.8 ;<br>X560.0  Y896.2 ;<br>X525.4  Y876.2 ;<br>X505.4  Y910.8 ;<br>X485.4  Y945.4 ;<br>X460.4  Y980.0 ;<br>X-500.0 Y1000.0;<br><br>....... | |

FIG. 7D

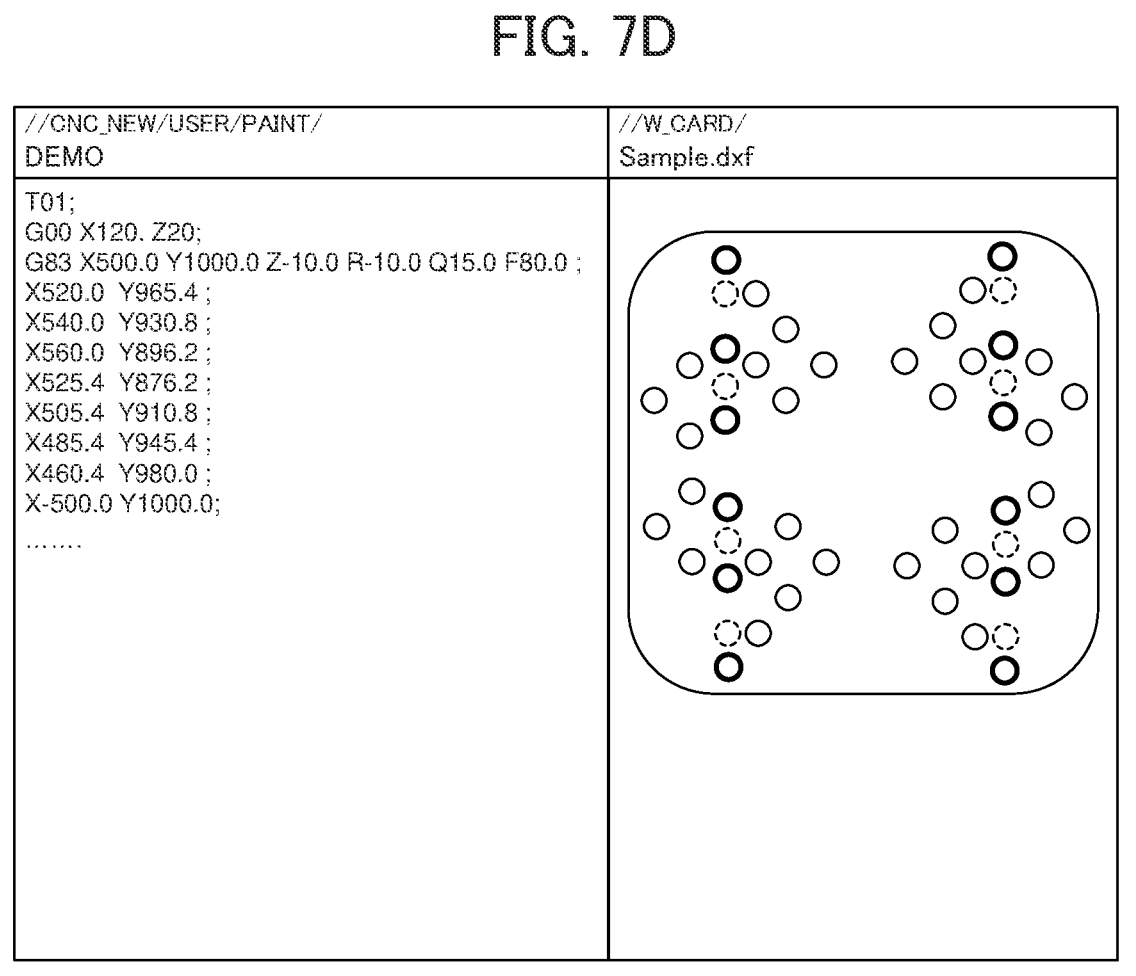

| //CNC_NEW/USER/PAINT/<br>DEMO | //W_CARD/<br>Sample.dxf |
|---|---|
| T01;<br>G00 X120. Z20;<br>G83 X500.0 Y1000.0 Z-10.0 R-10.0 Q15.0 F80.0 ;<br>X520.0  Y965.4 ;<br>X540.0  Y930.8 ;<br>X560.0  Y896.2 ;<br>X525.4  Y876.2 ;<br>X505.4  Y910.8 ;<br>X485.4  Y945.4 ;<br>X460.4  Y980.0 ;<br>X-500.0 Y1000.0;<br><br>....... | |

| //CNC_NEW/USER/PAINT/<br>DEMO | //W_CARD/<br>Sample.dxf |
|---|---|
| T01;<br>G00 X120. Z20;<br>G83 X500.0 Y1000.0 Z-10.0 R-10.0 Q15.0 F80.0 ;<br>X540.0  Y930.8 ;<br>X560.0  Y896.2 ;<br>X525.4  Y876.2 ;<br>X485.4  Y945.4 ;<br>X460.4  Y980.0 ;<br>X-500.0 Y1000.0;<br>X521.0 Y971.8;<br>X505.6  Y920.9;<br>X505.6  Y920.9;<br>....... | |

FIG. 10A

| //CNC_NEW/USER/PAINT/ DEMO | //W_CARD/ Sample.dxf |
|---|---|
| T01;<br>G00 X120. Z20;<br>G83 X500.0 Y1000.0 Z-10.0 R-10.0 Q15.0 F80.0 ;<br>~~X520.0  Y965.4~~ ;<br>X540.0  Y930.8 ;<br>X560.0  Y896.2 ;<br>X525.4  Y876.2 ;<br>~~X505.4  Y910.8~~ ;<br>X485.4  Y945.4 ;<br>X460.4  Y980.0 ;<br>X-500.0 Y1000.0;<br>X521.0 Y971.8;<br>X505.6  Y920.9;<br>X505.6  Y920.9;<br><br>............. | |

| //CNC_NEW/USER/PAINT/ DEMO | //W_CARD/ Sample.dxf |
|---|---|
| T01;<br>G00 X120. Z20;<br>G83 X500.0 Y1000.0 Z-10.0 R-10.0 Q15.0 F80.0 ;<br>~~X520.0  Y965.4~~ ;<br>X540.0  Y930.8 ;<br>X560.0  Y896.2 ;<br>X525.4  Y876.2 ;<br>~~X505.4  Y910.8~~ ;<br>X485.4  Y945.4 ;<br>X460.4  Y980.0 ;<br>X-500.0 Y1000.0;<br>X521.0 Y971.8;<br>X505.6  Y920.9;<br>X505.6  Y920.9;<br>……. | |

FIG. 11A

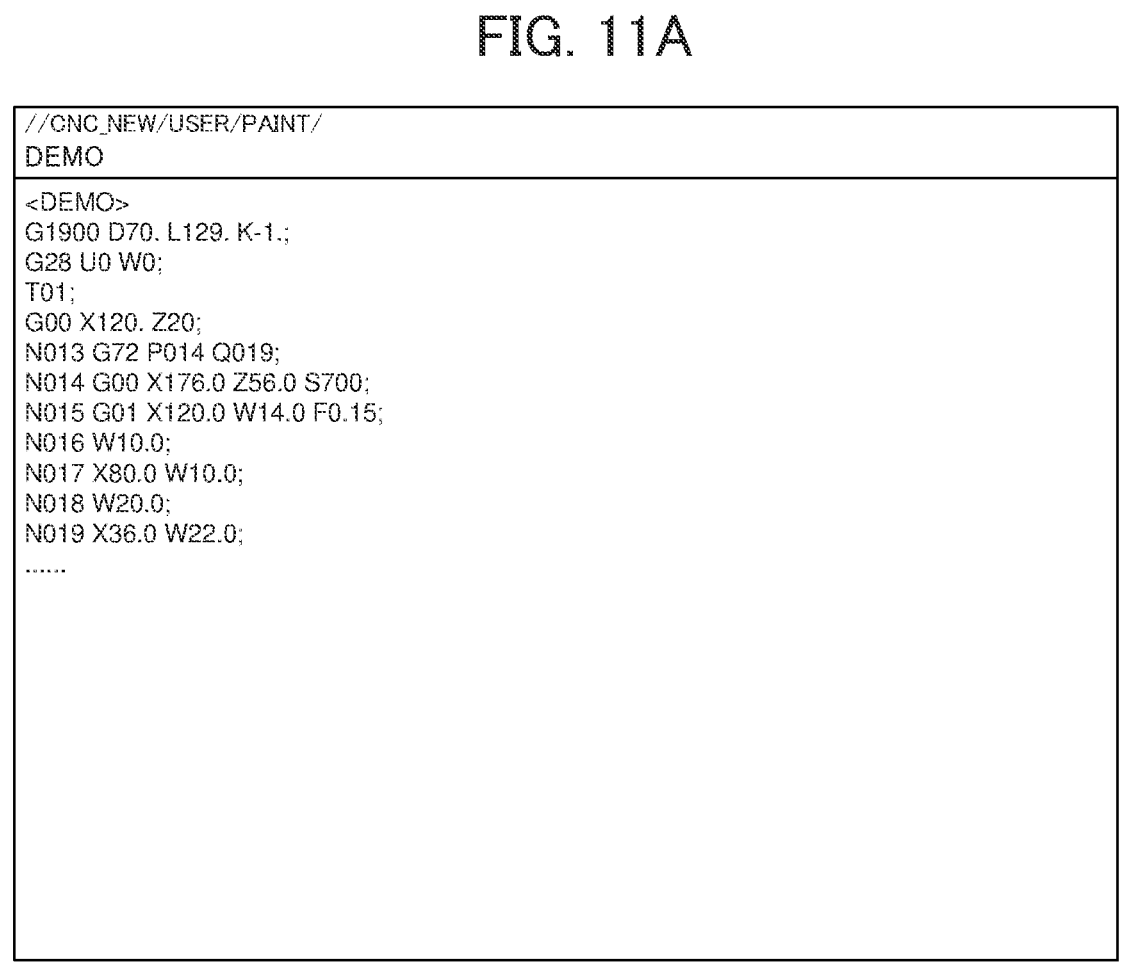

```
//CNC_NEW/USER/PAINT/
DEMO

<DEMO>
G1900 D70. L129. K-1.;
G28 U0 W0;
T01;
G00 X120. Z20;
N013 G72 P014 Q019;
N014 G00 X176.0 Z56.0 S700;
N015 G01 X120.0 W14.0 F0.15;
N016 W10.0;
N017 X80.0 W10.0;
N018 W20.0;
N019 X36.0 W22.0;
......
```

FIG. 11B

| //CNC_NEW/USER/PAINT/<br>DEMO | //W_CARD/<br>Sample.dxf |
|---|---|
| <DEMO><br>G1900 D70. L129. K-1.;<br>G28 U0 W0;<br>T01;<br>G00 X120. Z20;<br>N013 G72 P014 Q019;<br>N014 G00 X176.0 Z56.0 S700;<br>N015 G01 X120.0 W14.0 F0.15;<br>N016 W10.0;<br>N017 X80.0 W10.0;<br>N018 W20.0;<br>N019 X36.0 W22.0;<br><br>...... | |

FIG. 11C

| //CNC_NEW/USER/PAINT/ DEMO | //W_CARD/ Sample.dxf |
|---|---|
| <DEMO><br>G1900 D70. L129. K-1.;<br>G28 U0 W0;<br>T01;<br>G00 X120. Z20;<br>N013 G72 P014 Q019;<br>N014 G00 X176.0 Z56.0 S700;<br>N015 G01 X120.0 W14.0 F0.15;<br>N016 W10.0;<br>N017 X80.0 W10.0;<br>N018 W20.0;<br>N019 X36.0 W22.0;<br><br>...... | |

FIG. 11D

| //CNC_NEW/USER/PAINT/<br>DEMO | //W_CARD/<br>Sample.dxf |
|---|---|
| <DEMO><br>G1900 D70. L129. K-1.;<br>G28 U0 W0;<br>T01;<br>G00 X120. Z20;<br>N013 G72 P014 Q019;<br>N014 G00 X176.0 Z56.0 S700;<br>N015 G01 X120.0 W14.0 F0.15;<br>N016 W10.0;<br>N017 X80.0 W10.0;<br>N018 W20.0;<br>N019 X36.0 W22.0;<br><br>...... | |

FIG. 11F

| //CNC_NEW/USER/PAINT/<br>DEMO | //W_CARD/<br>Sample.dxf |
|---|---|
| <DEMO><br>G1900 D70. L129. K-1.;<br>G28 U0 W0;<br>T01;<br>G00 X120. Z20;<br>N013 G72 P014 Q019;<br>N014 G00 X176.0 Z56.0 S700;<br>N015 G01 X120.0 W14.0 F0.15;<br>N016 W10.0;<br>N017 G03 X80.0 W10.0 R20.0;<br>N018 G01 W20.0;<br>N019 X36.0 W22.0;<br><br>...... | |

FIG. 12 PRIOR ART

| //CNC_NEW/USER/PAINT/<br>DEMO | //W_CARD/<br>Sample.dxf |
|---|---|
| <DEMO><br>G28 U0 W0;<br>T01;<br>G00 X120. Z20;<br>G83 X500.0 Y1000.0 Z-10.0 R-10.0 Q15.0 F80.0 ;<br>X520.0  Y965.4 ;<br>X540.0  Y930.8 ;<br>X560.0  Y896.2 ;<br>X525.4  Y876.2 ;<br>X505.4  Y910.8 ;<br>X485.4  Y945.4 ;<br>X460.4  Y980.0 ;<br>X-500.0 Y1000.0;<br>X-520.0 Y965.4;<br>X-540.0 Y930.8;<br>X-560.0 Y896.2;<br>X-525.4  Y876.2<br>X-505.4 Y910.8;<br>X-485.4  Y945.4 ;<br>X-460.4  Y980.0 ;<br><br>....... | |

MACHINING PROGRAM EDITING ASSIST DEVICE

TECHNICAL FIELD

The present invention relates to a machining program editing assist device.

BACKGROUND ART

Conventionally, a technique has been used in which coordinate values necessary for machining can be output to a machining program by displaying a CAD drawing on a CNC and selecting a shape to be machined without using a CAM.

FIG. 12 shows an example of a display screen provided in a CNC in a conventional technique. In the example shown in FIG. 12, when a shape to be machined is selected on a CAD screen displayed on a right side of the display screen, coordinate values of the shape to be machined are output to a machining program displayed on a left side of the display screen.

In this regard, there is a technique in which a machining shape is input by a CAD device, a solid model is output from the CAD device to a numerical controller, and each axis is controlled by the numerical controller using the solid model (for example, Japanese Unexamined Patent Application, Publication No. 2010-267169).

Patent Document 1: Japanese Unexamined Patent Application, Publication No. 2010-267169

DISCLOSURE OF THE INVENTION

Problems to be Solved by the Invention

Conventionally, when there is a partial change in the CAD drawing, after a machining program created based on the CAD drawing before the change is deleted once, the CAD drawing after the change is displayed, all shapes are selected again, and the machining program needs to be recreated.

In this way, after the CAD drawing is changed, it is necessary to create a machining program by selecting shapes, which have not been changed, again. At this time, even when there are only a few changes, all shapes need to be selected again, which takes time and effort. Further, the machining program before the change needs to be deleted because of being capable of not being automatically corrected.

When a change is made to a CAD drawing, there is a demand for a technique that can easily reflect the change on the machining program.

Means for Solving the Problems

An aspect of the present disclosure provides a machining program editing assist device that assists generation of a machining program for a workpiece after a change based on CAD data for the workpiece after the change and a program for the workpiece before the change, the machining program editing assist device including: a CAD data analysis unit that analyzes the CAD data for the workpiece after the change and obtains CAD shape information which is shape information on the workpiece after the change; a machining program analysis unit that analyzes a machining program before the change and obtains machining shape information which is shape information on the workpiece before the change; an input shape prediction unit that obtains predicted shape information by performing shape matching between the CAD shape information obtained by the CAD data analysis unit and the machining shape information before the change obtained by the machining program analysis unit, and specifying a changed shape; and an NC program auto-generation unit that, based on the predicted shape information obtained by the input shape prediction unit, inserts a machining path existing only in the CAD data into the machining program, and deletes a machining path existing only in the machining program from the machining program.

Effects of the Invention

According to the aspect of the present disclosure, when a change is made to a CAD drawing, it is possible to easily reflect the change on the machining program.

BRIEF DESCRIPTION OF THE DRAWINGS

FIG. 2 shows an example of an existing program used in the machining program editing assist device according to the embodiment;

FIG. 3 shows an example of NC shape information used in the machining program editing assist device according to the embodiment;

FIG. 4 shows an example of CAD shape information used in the machining program editing assist device according to the embodiment;

FIG. 5 shows an example of change candidate shape information used in the machining program editing assist device according to the embodiment;

FIG. 6 shows an example of a new program used in the machining program editing assist device according to the embodiment;

FIG. 7A is a diagram showing an example of a screen transition of a display device provided in the machining program editing assist device according to the embodiment;

FIG. 7B is a diagram showing an example of a screen transition of a display device provided in the machining program editing assist device according to the embodiment;

FIG. 7C is a diagram showing an example of a screen transition of a display device provided in the machining program editing assist device according to the embodiment;

FIG. 7D is a diagram showing an example of a screen transition of a display device provided in the machining program editing assist device according to the embodiment;

FIG. 10A is a diagram showing an example of an operation screen of the display device provided in the machining program editing assist device according to the embodiment;

FIG. 11A is a diagram showing an example of a screen transition of the display device provided in the machining program editing assist device according to the embodiment;

FIG. 11B is a diagram showing an example of a screen transition of the display device provided in the machining program editing assist device according to the embodiment;

FIG. 11C is a diagram showing an example of a screen transition of the display device provided in the machining program editing assist device according to the embodiment;

FIG. 11D is a diagram showing an example of a screen transition of the display device provided in the machining program editing assist device according to the embodiment;

FIG. 11F is a diagram showing an example of a screen transition of the display device provided in the machining program editing assist device according to the embodiment; and FIG. 12 is a diagram showing an example of a display screen provided in a CNC according to a conventional technique.

PREFERRED MODE FOR CARRYING OUT THE INVENTION

An embodiment of the present invention will be described below with reference to FIGS. 1 to 11F.

1. Constitution of Embodiment

Figure 1:
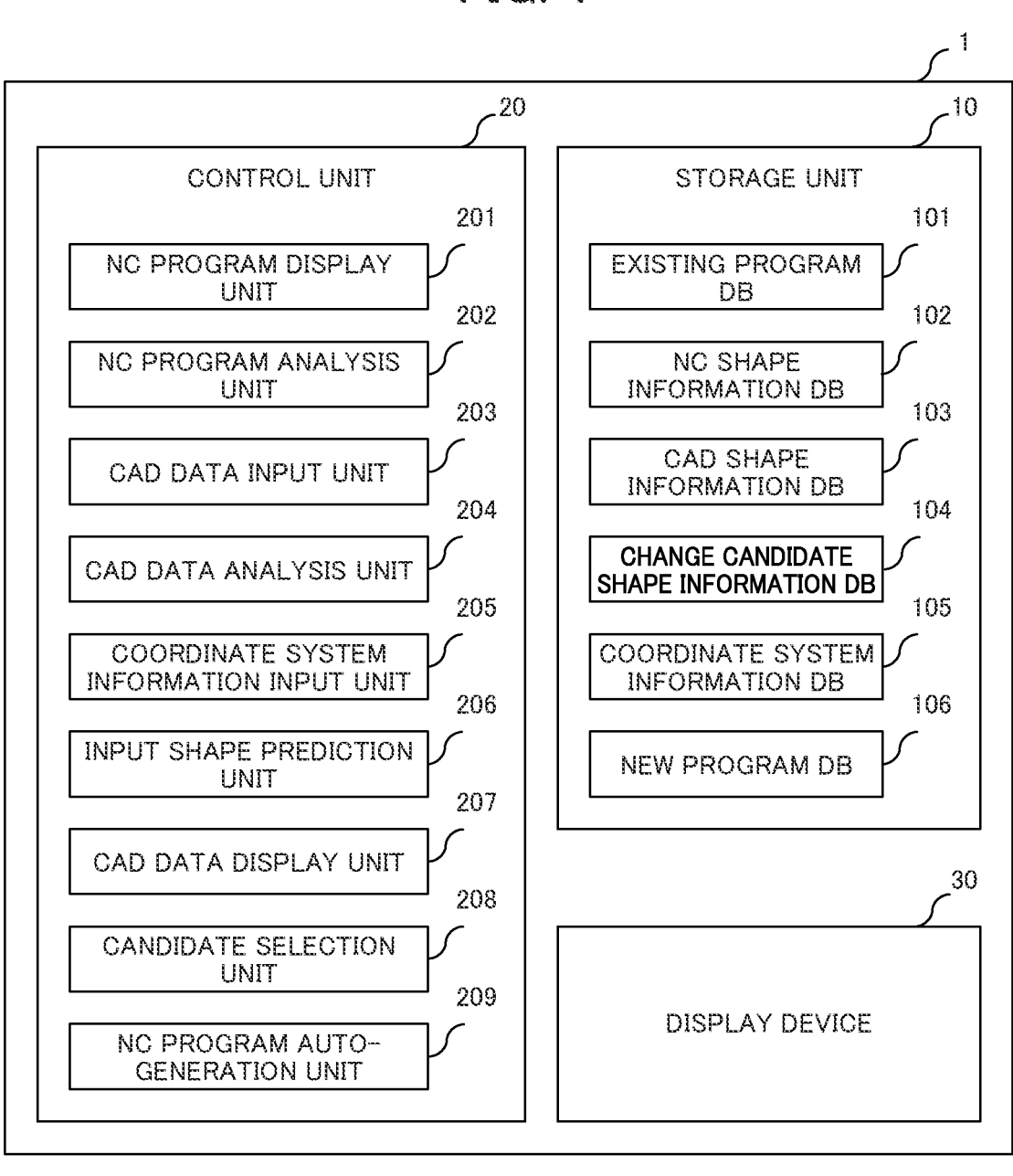
FIG. 1 is a functional block diagram of a machining program editing assist device according to an embodiment.

FIG. 1 is a functional block diagram of a machining program editing assist device 1 according to an embodiment of the present invention. The machining program editing assist device 1 includes a storage unit 10, a control unit 20, and a display device 30.

The storage unit 10 includes an existing program database 101, an NC shape information database 102, a CAD shape information database 103, a change candidate shape information database 104, a coordinate system information database 105, and a new program database 106.

The existing program database 101 stores an existing program that has been stored originally by a numerical controller including the machining program editing assist device 1.

FIG. 2 shows an example of an existing program. A "G83" on a first row indicates a command that defines a deep hole drilling cycle. Each of X and Y indicates data of a hole position. In the example shown in FIG. 2, data of M hole positions from a hole position P1 to a hole position PM are defined.

Further, a "G72" on a sixth row indicates a command that defines an end face rough-cutting cycle. A number denoted by P is a sequence number of a first shape block. Further, a number denoted by Q is a sequence number of the last shape block. In addition, a number attached with N is a sequence number of each block. Further, X indicates a coordinate value in an X-direction, and W indicates a distance of a finishing allowance in a direction of a first axis of a plane (an X-axis in a case of a ZX-plane).

The NC shape information database 102 is a database that stores NC shape information. Here, the "NC shape information" indicates workpiece shape information, which is generated when a NC program analysis unit 202 to be described below analyzes the existing program, before CAD information is changed. In the following description, the "NC shape information" is also referred to as "machining shape information" that is the workpiece shape information, which is generated by the analysis of the existing program, before the CAD information is changed.

FIG. 3 shows an example of the NC shape information. In the example shown in FIG. 3, the NC shape information is shown as an NC shape list constituted by rows indicating hole positions and rows indicating contours. In the rows indicating the hole positions, a number attached with P indicates a sequence number, followed by coordinates of a center point. Further, in the rows indicating the contours, each row indicates an element that constitutes the contour, and a number attached with E indicates a sequence number. Further, when the element is a straight line, the row defining the element includes a start point and an end point as parameters. When the element is a circle, the row defining the element includes a center point and a radius as parameters. When the element is a circular arc, the row defining the element includes a center point, a radius, a starting point angle, and an end point angle as parameters.

The CAD shape information database 103 is a database that stores the CAD shape information. Here, the "CAD shape information" indicates workpiece shape information, which is generated when a CAD data analysis unit 204 to be described below analyzes CAD data input by a CAD data input unit 203, after the CAD information is changed.

FIG. 4 shows an example of the CAD shape information. In the example shown in FIG. 4, the CAD shape information is shown as a CAD shape list constituted by rows indicating hole positions and rows indicating contours, as in the NC shape information shown in FIG. 3. In rows indicating the hole positions, a number attached with P is a sequence number, followed by coordinates of a center point. Further, in the rows indicating the contours, each row indicates an element that constitutes the contour, and a number attached with E indicates a sequence number. Comparing the CAD shape information shown in FIG. 4 with the NC shape information shown in FIG. 3, while a row for a hole position P3 disappears, a row for a hole position P(M+1) is added. Further, as for the contour, it can be seen that rows for an element E2 and an element E3 disappear and a row for an element E3' is added.

The change candidate shape information database 104 is a database that stores change candidate shape information. Here, the "change candidate shape information" indicates information obtained by an input shape prediction unit 206 (to be described below) that performs matching between the shape information on the workpiece before the CAD information is changed and the CAD shape information after the change of the CAD information and specifies a changed shape as a result. In the following description, the "change candidate shape information" is also called "predicted shape information".

FIG. 5 shows an example of the change candidate shape information (predicted shape information). In FIG. 5, the change candidate shape information (predicted shape information) is shown as a change candidate shape list constituted by rows indicating hole positions and rows indicating contours, as in the NC shape information and the CAD shape list. FIG. 5 shows an example in which the rows indicating the hole positions and the rows indicating the contours use flags to show shape information states. In the example of FIG. 5, a flag with flag=0 means "delete", a flag with flag=1 means "maintain", and a flag with flag=2 means "add". Referring to FIG. 5, in the workpiece shape information before the CAD information is changed, rows (hole position P3 and element E3) deleted due to the change of the CAD information are flagged with flag=0, for example, and are deleted at the same time. Further, rows (hole positions P1, P2, and PM and elements E1 and EM), which do not change even when the CAD information is changed, are flagged with flag=1, for example, and are maintained in a state of being described. In addition, rows (hole position P(M+1) and elements E2 and E3) added by the change of the CAD information are flagged with flag=2, for example.

The coordinate system information database 105 is a database that stores coordinate system information. Here, the "coordinate system information" is information relating to a coordinate system input by a coordinate system information input unit 205 to be described below, and includes, for example, a workpiece coordinate system used in an NC program and a CAD coordinate system used in a CAD device. Further, examples of the CAD coordinate system include a user coordinate system (UCS) and a world coordinate system (WCS), and the user coordinate system (UCS) can be arbitrarily set by a user.

The new program database 106 is a database that stores a new program automatically generated by an NC program auto-generation unit 209 which will be described below.

FIG. 6 shows an example of the new program. Compared with the example of the existing program shown in FIG. 2, while the row for the hole position P3 and the row for the element E3 disappear, rows for a hole position P(M+1) and an element E3' are added.

The control unit 20 includes a CPU, a ROM, a RAM, and a CMOS memory, which are constituted to communicate with each other via a bus, and is known to those skilled in the art.

The CPU is a processor that controls an overall operation of the machining program editing assist device 1. The CPU reads a system program and an application program stored in the ROM through the bus to control the overall operation of the machining program editing assist device 1 according to the system program and the application program, and is constituted such that the control unit 20 implements functions of an NC program display unit 201, an NC program analysis unit 202, a CAD data input unit 203, a CAD data analysis unit 204, a coordinate system information input unit 205, an input shape prediction unit 206, a CAD data display unit 207, a candidate selection unit 208, and an NC program auto-generation unit 209 as shown in FIG. 1.

The NC program display unit 201 displays, on the display device 30 to be described below, the existing program, which is stored in the existing program database 101, before the CAD information is changed, or the new program, which is stored in the new program database 106, after the CAD information is changed.

The NC program analysis unit 202 analyzes the existing program, which is stored in the existing program database 101, before the CAD information is changed, to generate NC shape information, and stores the NC shape information in the NC shape information database 102.

The CAD data input unit 203 input CAD data from the CAD device included in the numerical controller including the machining program editing assist device 1.

The CAD data analysis unit 204 analyzes the CAD data input by the CAD data input unit 203 to generate CAD shape information, and stores the CAD shape information in the CAD shape information database 103.

The coordinate system information input unit 205 stores the coordinate system information in the coordinate system information database 105.

The input shape prediction unit 206 performs matching between the NC shape information that is generated by the analysis of the existing program before the CAD information is changed and is stored in the NC shape information database 102 and the CAD shape information that is generated by the analysis of the CAD data after the CAD information is changed and is stored in the CAD shape information database 103, generates the change candidate shape information (predicted shape information) for specifying the changed shape according to the coordinate system included in the coordinate system information stored in the coordinate system information database 105, and stores the generated change candidate shape information in the change candidate shape information database 104.

The CAD data display unit 207 displays, on the display device 30 to be described below, the CAD shape information stored in the CAD shape information database 103 and the change candidate shape information (predicted shape information) stored in the change candidate shape information database 104 according to the coordinate system included in the coordinate system information stored in the coordinate system information database 105, and outputs the shape display of the change candidate to the candidate selection unit 208 at the same time.

The candidate selection unit 208 selects a change candidate from the change candidates displayed on the display device 30 by the CAD data display unit 207, and outputs the selected change candidate to the NC program auto-generation unit 209.

The NC program auto-generation unit 209 automatically generates a new program based on the existing program stored in the existing program database 101, the change candidate shape information (predicted shape information) stored in the change candidate shape information database 104, and the selection result of the change candidate by the candidate selection unit 208, and stores the automatically generated new program in the new program database 106. More specifically, the NC program auto-generation unit 209 inserts a machining path existing only in the CAD data after the change of the CAD information into the existing program, based on the change candidate shape information (predicted shape information) obtained by the input shape prediction unit 206, and deletes a machining path existing only in the existing program before the change of the CAD information from the existing program, thereby automatically generating a new program and storing the automatically generated new program in the new program database 106.

The display device 30 is a device that displays the existing program stored in the existing program database 101 and the new program stored in the new program database 106. Further, the display device 30 is a device that displays the CAD shape information stored in the CAD shape information database 103 and the change candidate shape information (predicted shape information) stored in the change candidate shape information database 104 according to the coordinate system included in the coordinate system information stored in the coordinate system information database 105. The display device 30 can be realized by a liquid crystal monitor, for example.

2 Example

2.1 Setting of Hole Position

FIGS. 7A to 7F are diagrams showing an example of transition of a display screen on the display device 30 at the time of setting the hole position.

First, as shown in FIG. 7A, the display device 30 displays an existing program selected by the user.

Next, on the display screen shown in FIG. 7B, the CAD data analysis unit 204 analyzes CAD data after the change of CAD information selected by the user.

Next, on the display screen shown in FIG. 7C, the NC program analysis unit 202 analyzes the existing program before the change of the CAD information.

Thereafter, the input shape prediction unit 206 obtains a difference between NC shape information before the change of the CAD information and CAD shape information after the change of the CAD information, and stores the difference in the change candidate shape information database 104. Further, for example, the number of shapes in the NC shape information before the change of the CAD information, which is maintained in the CAD shape information after the change of the CAD information is divided by the total number of shapes included in the NC shape information before the change of the CAD information, thereby calculating a degree of similarity, and when either a first condition that the degree of similarity exceeds a specified value or a second condition that a CAD file name and an NC program name is equal is established, the display screen of the display device 30 transitions to FIG. 7D below. However, a method of calculating the degree of similarity is not limited thereto.

On the display screen shown in FIG. 7D, holes existing only in the CAD shape information are highlighted by bold lines, and holes existing only in the NC shape information are highlighted by dotted lines.

Figure 7E:
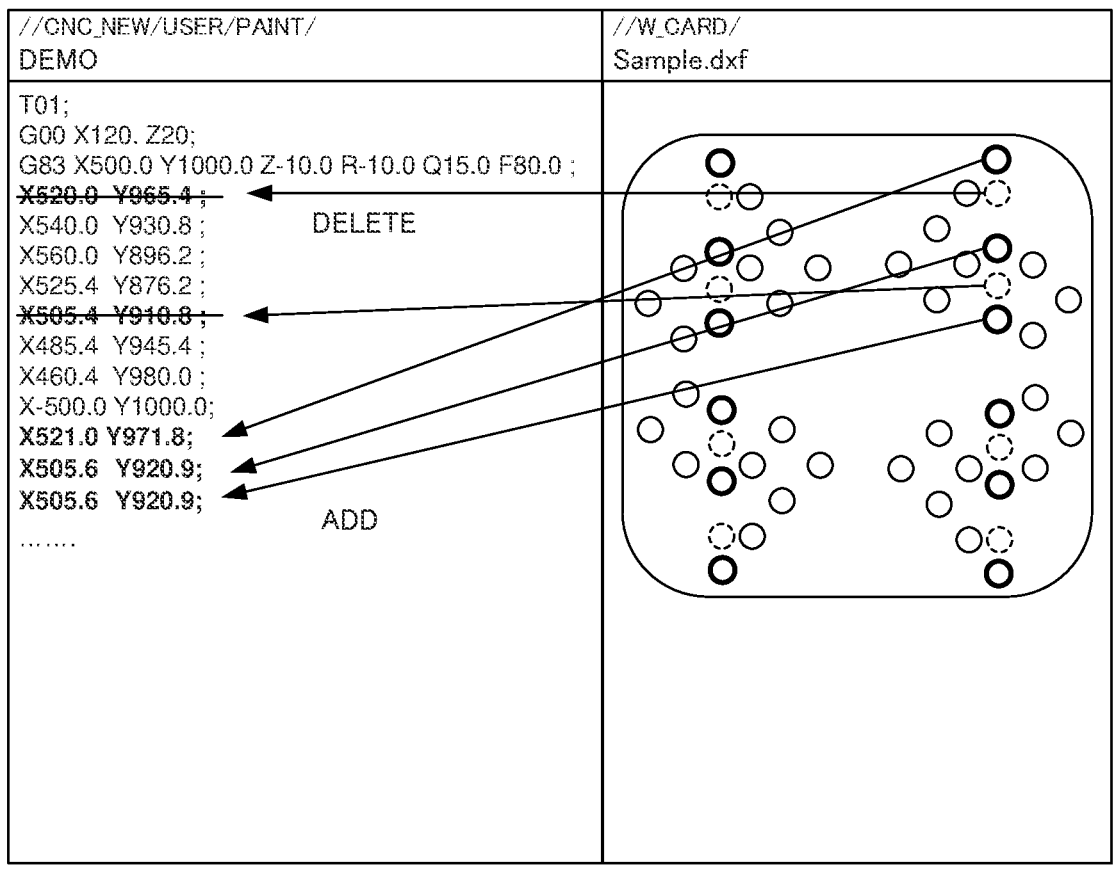
FIG. 7E is a diagram showing an example of a screen transition of a display device provided in the machining program editing assist device according to the embodiment.

On the display screen shown in FIG. 7E, the NC program auto-generation unit 209 generates a new program on which the difference is reflected, and displays the new program on the screen. More specifically, the display device 30 displays a block, which defines hole information existing only in the CAD shape information, in a state of being added to the existing program, and displays a block, which defines hole information existing only in the NC shape information, in a state of being deleted from the existing program.

Figure 7F:
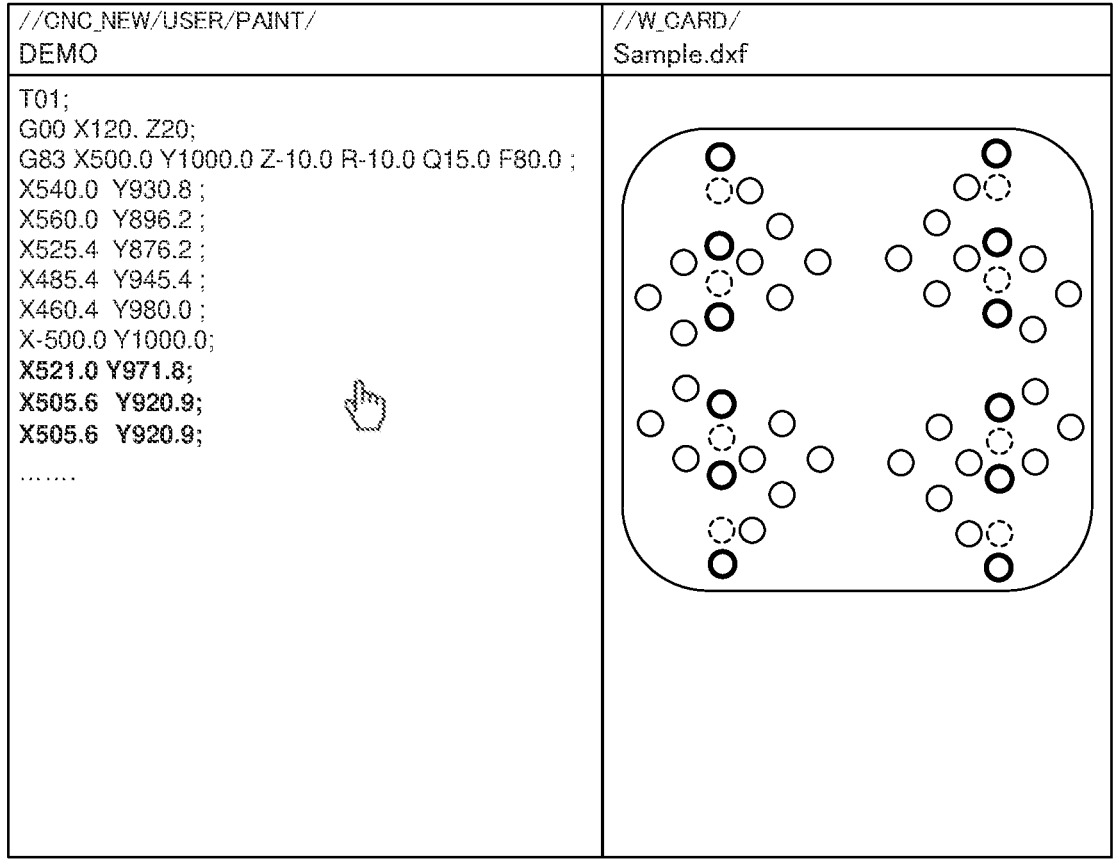
FIG. 7F is a diagram showing an example of a screen transition of a display device provided in the machining program editing assist device according to the embodiment.

In FIG. 7F, as will be described below, the user modifies the program by touching the screen on the program side or clicking soft keys. Thereby, it is possible to reflect the difference before and after the change of the CAD information on the new program.

Figure 8:
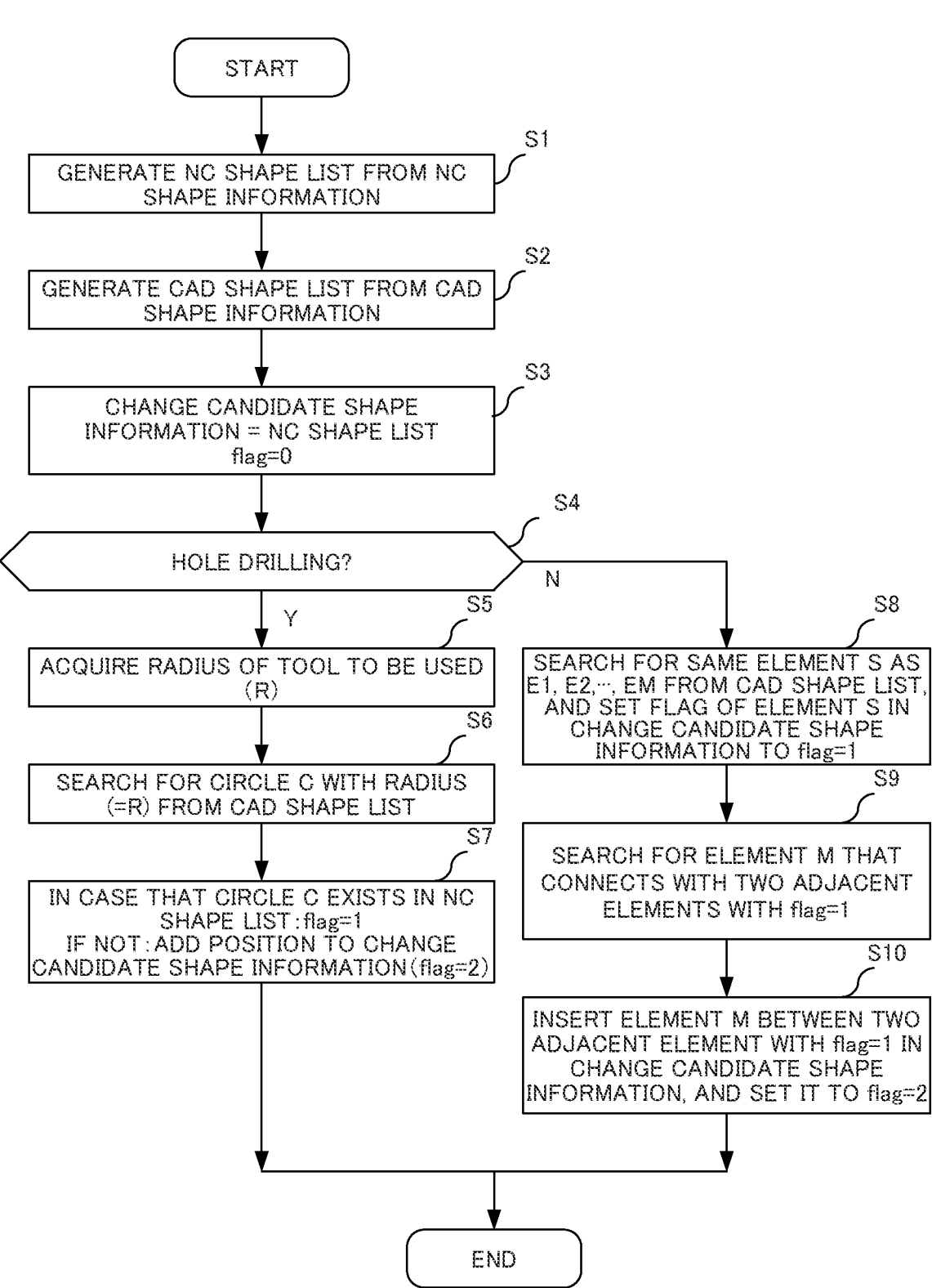
FIG. 8 is a flowchart showing an operation of an input shape prediction unit provided in the machining program editing assist device according to the embodiment.

FIG. 8 is a flowchart showing the operation of the input shape prediction unit 206 when the difference before and after the change of the CAD information is reflected on the new program through the screen transitions as shown in FIGS. 7A to 7F.

In Step S1, the input shape prediction unit 206 generates an NC shape list based on NC shape information.

In Step S2, the input shape prediction unit 206 generates CAD shape list based on CAD shape information.

In Step S3, the input shape prediction unit 206 sets all change candidate shape information (predicted shape information) to the NC shape list, and sets flags on all rows to flag=0.

In Step S4, when hole drilling is performed (S4: Y), the process proceeds to Step S5. When the hole drilling is not performed (S4: N), the process proceeds to Step S8.

In Step S5, the input shape prediction unit 206 acquires a radius R of a tool to be used.

In Step S6, the input shape prediction unit 206 searches for a circle C with a radius being R from the CAD shape list.

In Step S7, the input shape prediction unit 206 sets a flag on a row defining the circle C to 1, for example, when the NC shape list involves the circle C. Otherwise, a position of the circle C is added to the change candidate shape information (predicted shape information), and a flag is set to flag=2, for example.

In Step S8, the input shape prediction unit 206 searches for an element S such as E1, E2, . . . , EM from the CAD shape list, and sets a flag of the element S included in the change candidate shape information (predicted shape information) to flag=1.

In Step S9, the input shape prediction unit 206 searches, from the CAD shape list, for an element M that connects with two adjacent elements with flag=1, for example.

In Step S10, the input shape prediction unit 206 inserts the element M between two adjacent elements with flag=1 in the change candidate shape information (predicted shape information), for example, and sets the element M to flag=2, for example.

Figure 9:
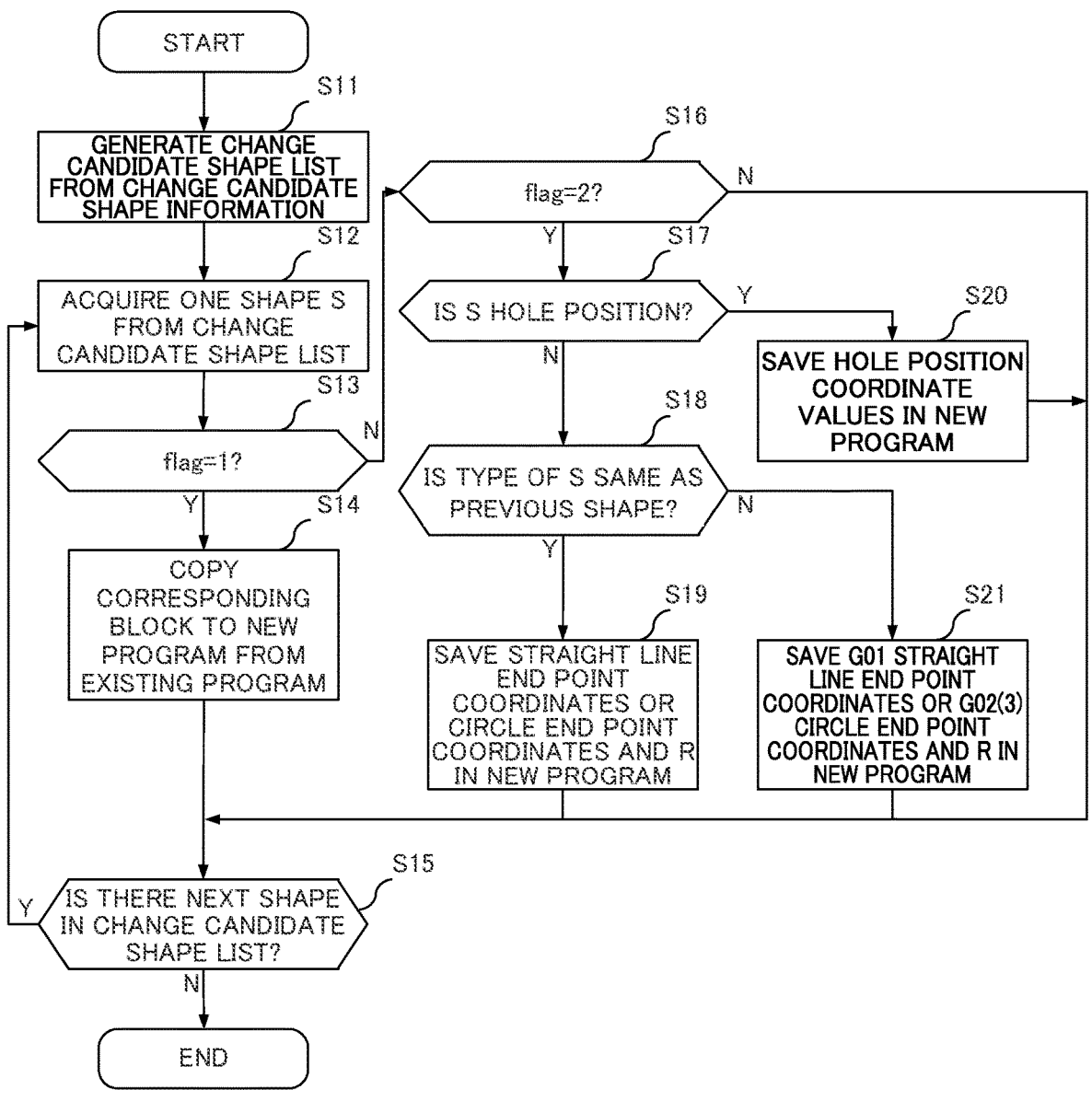
FIG. 9 is a flowchart showing an operation of an NC program generation unit provided in the machining program editing assist device according to the embodiment.

FIG. 9 is a flowchart showing the operation of the NC program auto-generation unit 209 when the difference before and after the change of the CAD information is reflected on the new program through the screen transitions as shown in FIGS. 7A to 7F.

In Step S11, the NC program auto-generation unit 209 generates a change candidate shape list based on change candidate shape information (predicted shape information).

In Step S12, the NC program auto-generation unit 209 acquires one shape S from the change candidate shape list.

In Step S13, as an example, when a flag is set to a value of 1 (flag=1) (S13: Y), the process proceeds to Step S14. As an example, when a flag is not set to a value of 1 (S13: N), the process proceeds to Step S16.

In Step S14, the NC program auto-generation unit 209 copies a corresponding block from the existing program to the new program.

In Step S15, when there is a next shape in the change candidate shape list (S15: N), the process ends. When there is no next shape (S15: Y), the process proceeds to Step S12.

In Step S16, as an example, when a flag is set to a value of 2 (flag=2) (S16: Y), the process proceeds to Step S17. As an example, when a flag is not set to a value of 2 (S16: N), the process proceeds to Step S15.

In Step S17, when S is a hole position (S17: Y), the process proceeds to Step S20. When S is not a hole position (S17: N), the process proceeds to Step S18.

In Step S18, when a type of S is the same as the previous shape (S18: Y), the process proceeds to Step S19. When a type of S is different from the previous shape (S18: N), the process proceeds to Step S21.

In Step S19, the NC program auto-generation unit 209 saves straight line end point coordinates or circle end point coordinates and R in the new program. Thereafter, the process proceeds to Step S15.

In Step S20, the NC program auto-generation unit 209 saves coordinate values of the hole positions in the new program.

In Step S21, the NC program auto-generation unit 209 saves G01 straight line end point coordinates or G02(3) circle end point coordinates and R in the new program.

As described above, a specific example will be described with respect to a method used by the user when modifying the program by touching the screen on the program side or clicking soft keys in FIG. 7F.

The candidate selection unit 208 detects the user's touch on the screen or the user's key operation, and determines a shape and a program that the user wants to change based on the detected information, and the NC program auto-generation unit 209 reflects, on the existing program, only the shape the user wants to change, based on the shape, in which the user wants to change, determined by candidate selection unit 208 and the change candidate shape information (predicted shape information) stored in the change candidate shape information database 104.

Figure 10A:
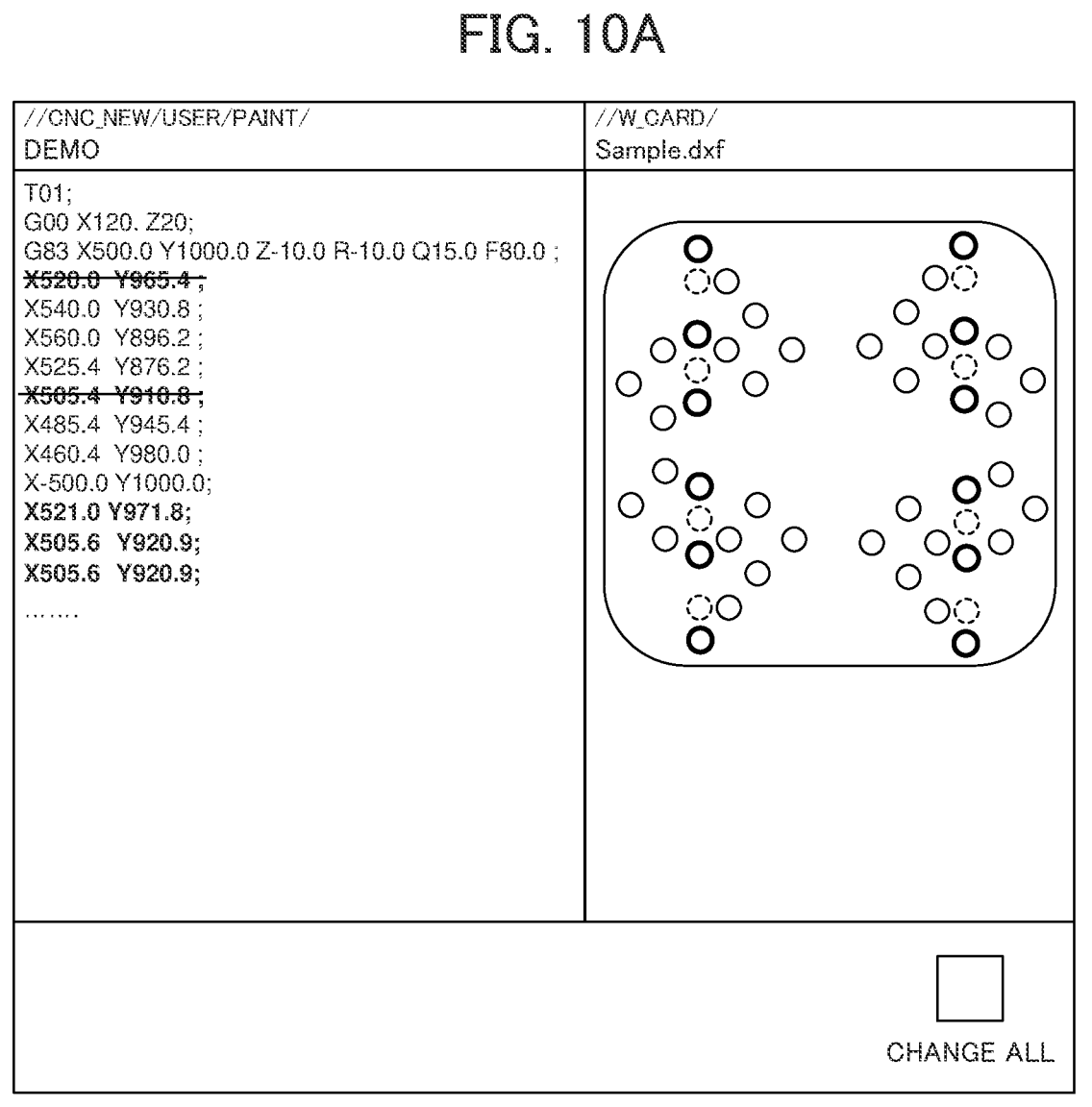
Figure 10B:
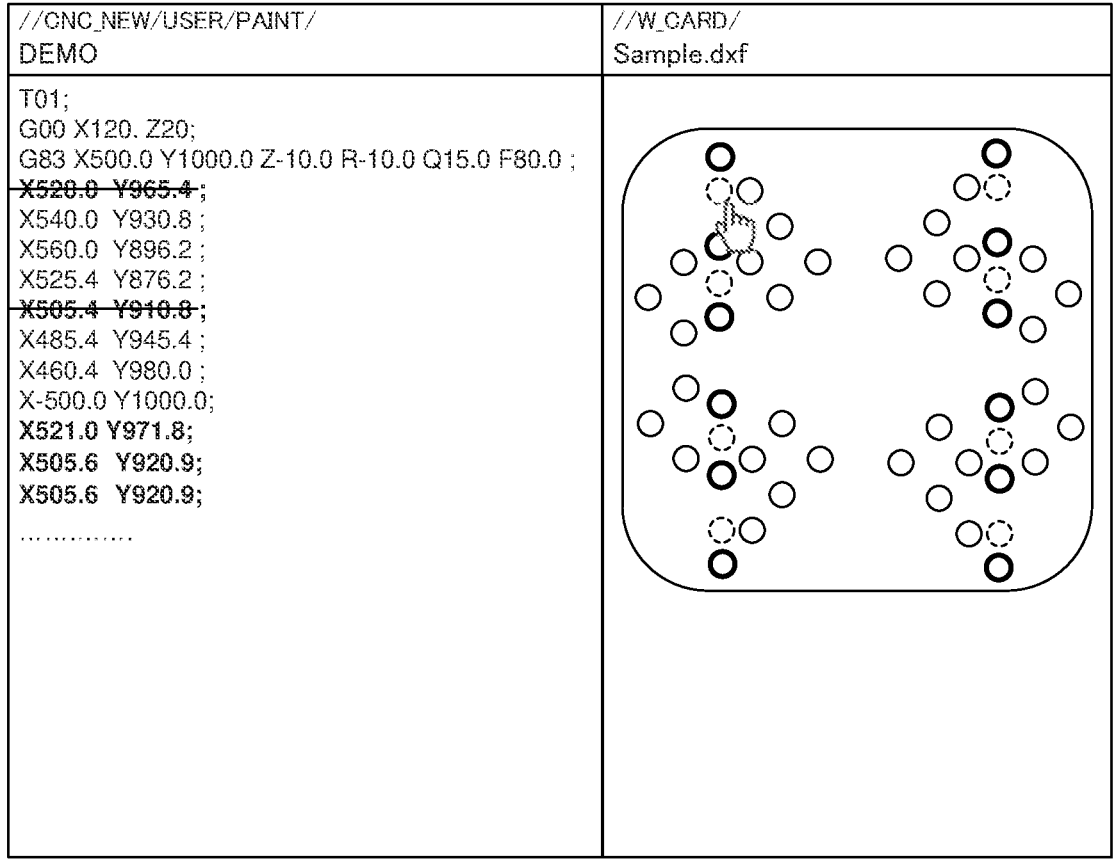
FIG. 10B is a diagram showing an example of an operation screen of the display device provided in the machining program editing assist device according to the embodiment.

FIGS. 10A to 10D are diagrams showing an operation example of the candidate selection unit 208. As shown in FIG. 10A, a soft key is provided at a bottom of a display screen for instructing to change all differences, and the user may reflect all the differences on the new program by clicking the soft key.

Alternatively, as shown in FIG. 10B, the user may touch one of shapes shown as differences on a CAD screen, thereby reflecting only the one selected shape on the new program.

Figure 10C:
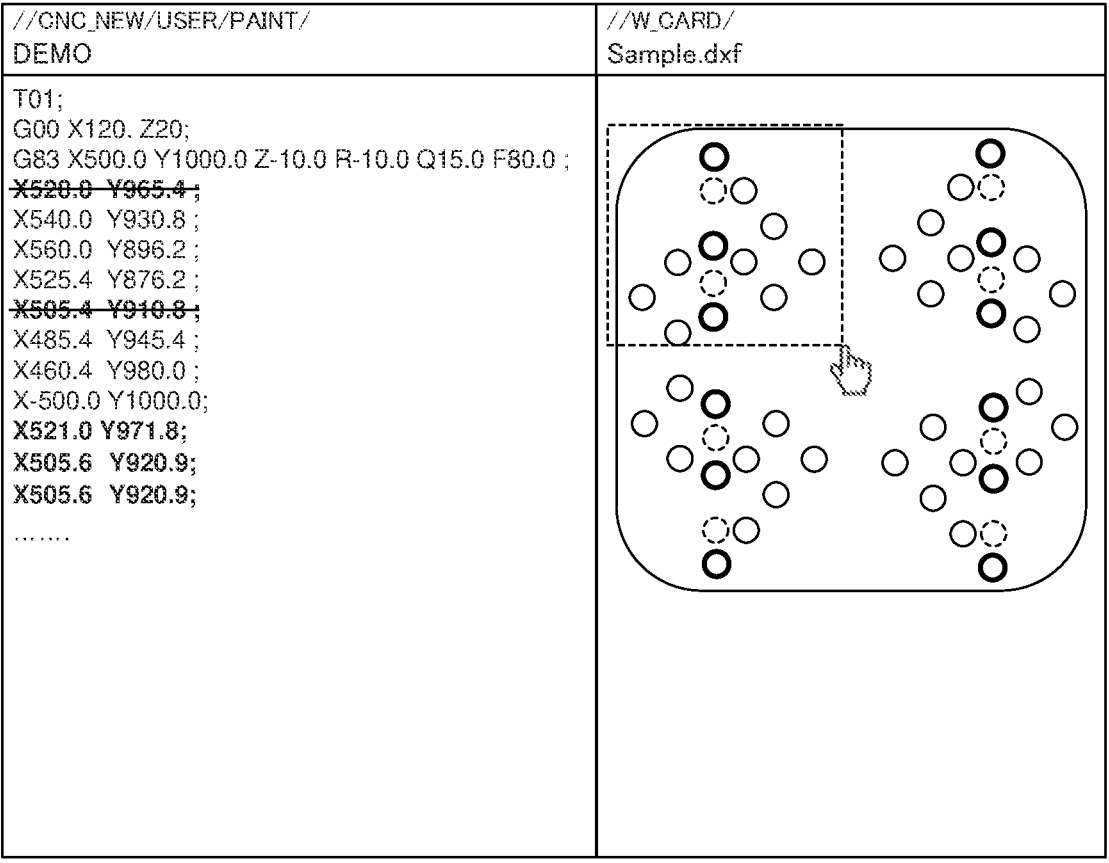
FIG. 10C is a diagram showing an example of an operation screen of the display device provided in the machining program editing assist device according to the embodiment.

Alternatively, as shown in FIG. 10C, the user may drag a mouse on the CAD screen, and reflect all differences within a range selected by the drag on the new program.

Figure 10D:
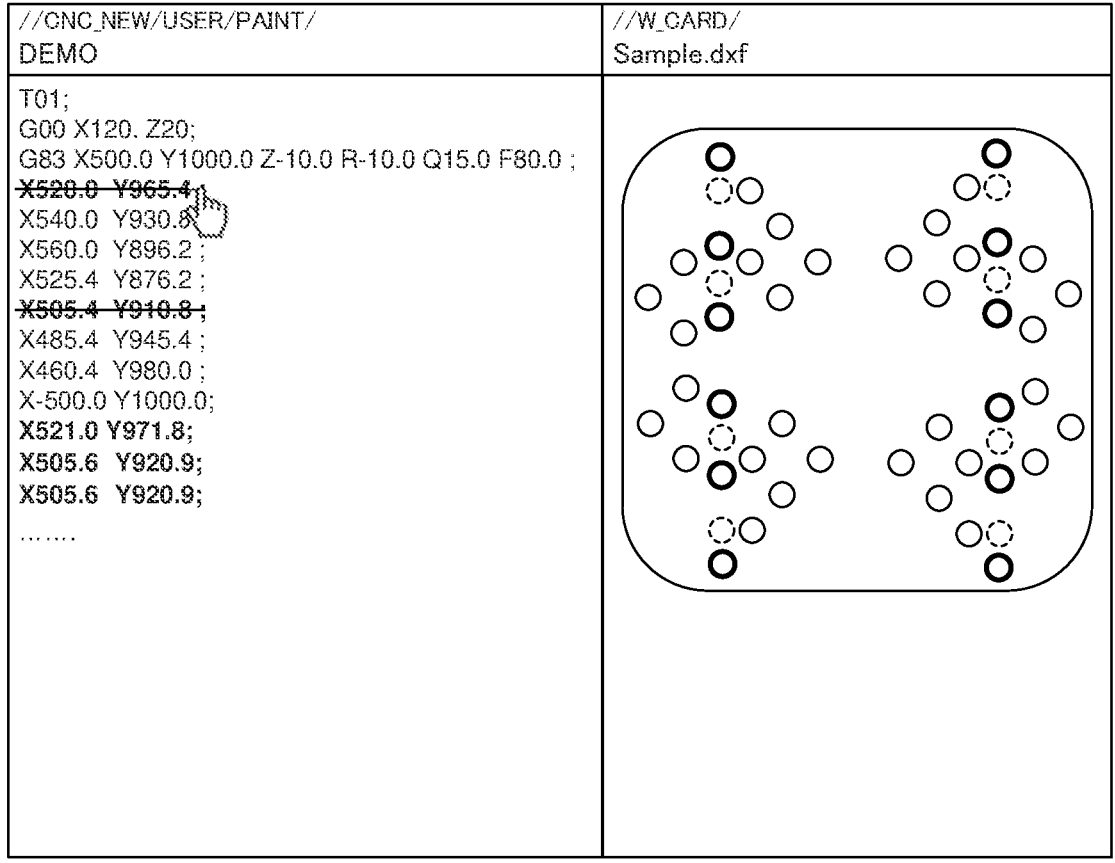
FIG. 10D is a diagram showing an example of an operation screen of the display device provided in the machining program editing assist device according to the embodiment.

Alternatively, as shown in FIG. 10D, the user may touch a block that is a candidate for difference in the existing program, and reflect only the selected block on the new program.

2.2 Setting of Contour Shape

FIGS. 11A to 11F are diagram showing a transition of the display screen on the display device 30 at the time of setting the contour shape.

First, as shown in FIG. 11A, the display device 30 displays the existing program selected by the user.

Next, on the display screen shown in FIG. 11B, the CAD data analysis unit 204 analyzes CAD data after the change of CAD information selected by the user.

Next, on the display screen shown in FIG. 11C, the NC program analysis unit 202 analyzes the existing program before the change of the CAD information.

Thereafter, the input shape prediction unit 206 obtains a difference between NC shape information before the change of the CAD information and CAD shape information after the change of the CAD information, and stores the difference in the change candidate shape information database 104. Further, for example, the number of shapes in the NC shape information before the change of the CAD information, which is maintained in the CAD shape information after the change of the CAD information is divided by the total number of shapes included in the NC shape information before the change of the CAD information, thereby calculating a degree of similarity, and when either a first condition that the degree of similarity exceeds a specified value or a second condition that a CAD file name and an NC program name is equal is established, the display screen of the display device 30 transitions to FIG. 11D below. However, a method of calculating the degree of similarity is not limited thereto.

On the display screen shown in FIG. 11D, contours existing only in the CAD shape information are highlighted by bold lines, and contours existing only in the NC shape information are highlighted by dotted lines.

Figure 11E:
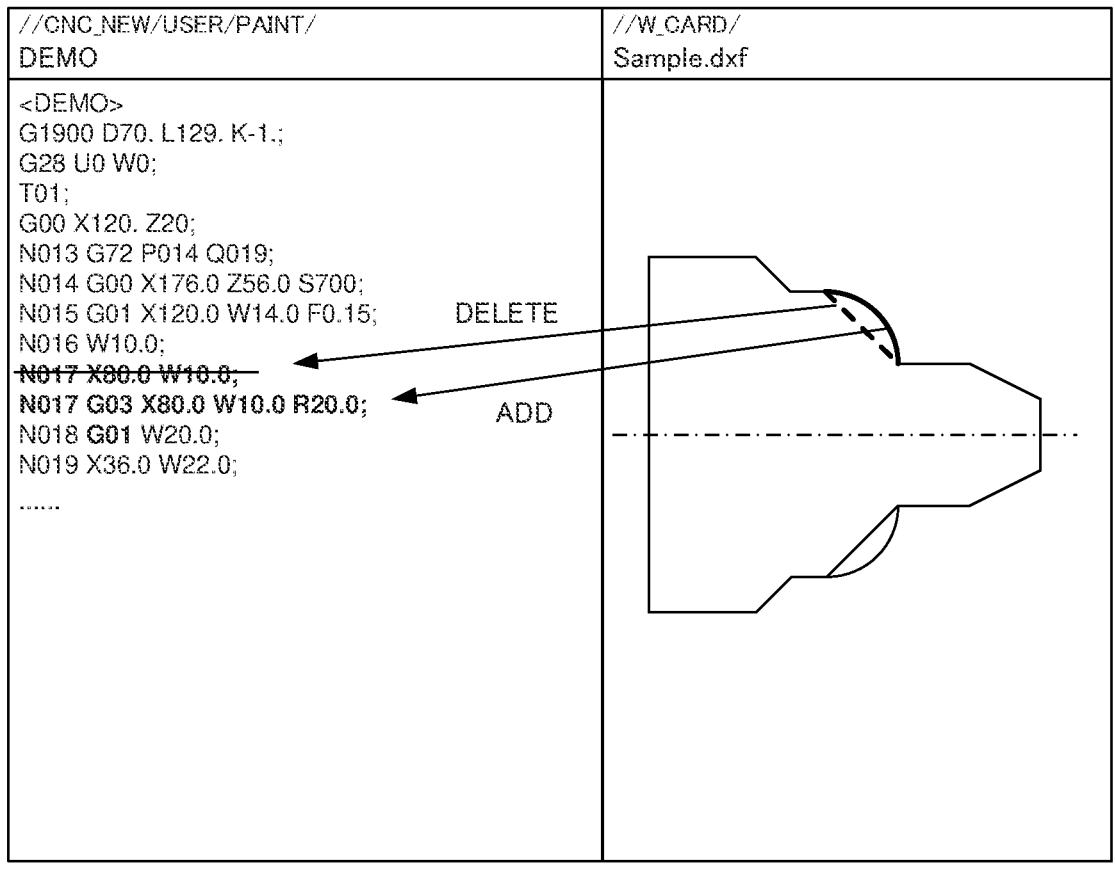
FIG. 11E is a diagram showing an example of a screen transition of the display device provided in the machining program editing assist device according to the embodiment.

On the display screen shown in FIG. 11E, a new program, on which the difference is reflected, is generated, and displayed on the screen. More specifically, the display device 30 displays a program, which defines contour information existing only in the CAD shape information, in a state of being added to the existing program, and displays a program, which defines contour information existing only in the NC shape information, in a state of being deleted from the existing program.

On the display screen shown in FIG. 11F, the user modifies the program by touching the screen on the program side or clicking soft keys. Thereby, it is possible to reflect the difference before and after the change of the CAD information on the new program.

3 Effects of Embodiment (1) The machining program editing assist device (for example, the "machining program editing assist device 1" described above) according to the above embodiment is a machining program editing assist device that assists generation of a machining program for a workpiece after a change based on CAD data for the workpiece after the change and a program for the workpiece before the change, the machining program editing assist device including: a CAD data analysis unit (for example, the "CAD data analysis unit 204" described above) that analyzes the CAD data for the workpiece after the change and obtains CAD shape information which is shape information on the workpiece after the change; a machining program analysis unit (for example, the "NC program analysis unit 202" described above) that analyzes a machining program before the change and obtains machining shape information which is shape information on the workpiece before the change; an input shape prediction unit (for example, the "input shape prediction unit 206" described above) that obtains predicted shape information by performing shape matching between the CAD shape information obtained by the CAD data analysis unit and the machining shape information before the change obtained by the machining program analysis unit, and specifying a changed shape; and an NC program auto-generation unit (for example, the "NC program auto-generation unit 209" described above) that, based on the predicted shape information obtained by the input shape prediction unit, inserts a machining path existing only in the CAD data into the machining program, and deletes a machining path existing only in the machining program from the machining program.

Thereby, when a change is made to a CAD drawing, it is possible to easily reflect the change on the machining program.

(2) In the machining program editing assist device disclosed in (1) above, the input shape prediction unit 206 predicts the input shape only when the degree of similarity is high between the shape information for the workpiece after the shape is changed and the machining shape information for the workpiece before the shape is changed.

Thereby, it is not necessary to predict the input shape when it is difficult to predict the input shape due to a significant change in shape before and after the change.

(3) In the machining program editing assist device disclosed in (1) or (2) above, the machining program editing assist device further includes the display unit (for example, the "display device 30" described above) that displays the result of the shape matching performed by the input shape prediction unit.

Thereby, the user of the machining program editing assist device can determine whether to reflect the difference between before and after the change on the new program by visually checking the result of matching.

(4) In the machining program editing assist device disclosed in (3) above, the candidate for the change in shape is selectable in the display unit based on the difference between the CAD shape information and the machining shape information before the change obtained by the machining program analysis unit.

Thereby, the user of the machining program editing assist device can select a candidate for the shape change by visually checking the difference between before and after the change.

EXPLANATION OF REFERENCE NUMERALS 1 machining program editing assist device
10 storage unit
20 control unit
30 display device
101 existing program database
102 NC shape information database
103 CAD shape information database
104 change candidate shape information database
105 coordinate system information database
106 new program database
201 NC program display unit
202 NC program analysis unit
203 CAD data input unit
204 CAD data analysis unit
205 coordinate system information input unit
206 input shape prediction unit
207 CAD data display unit
208 candidate selection unit
209 NC program auto-generation unit

The invention claimed is:

1. A numerical controller that assists generation of a machining program for a workpiece after a change based on CAD data for the workpiece after the change and a machining program for the workpiece before the change, the numerical controller comprising:
a memory; and
a processor, wherein the processor is configured to:
analyze the CAD data for the workpiece after the change and obtains CAD shape information which is shape information on the workpiece after the change;
analyze a machining program before the change and obtains machining shape information which is shape information on the workpiece before the change;
obtain predicted shape information by performing shape matching between the CAD shape information which is shape information on the workpiece after the change and the machining shape information which is shape information on the workpiece before the change, and specifying a changed shape; and
insert, based on the predicted shape information which is shape information on the workpiece after the change, a machining path existing only in the CAD data which is shape information on the workpiece after the change into the machining program, and delete a machining path existing only in the machining program before the change from the machining program, thereby auto-generating a numerical controller program.

2. The numerical controller according to claim 1, wherein the processor is further configured to predict an input shape only when a degree of similarity is high between the shape information for the workpiece after the shape is changed and the machining shape information for the workpiece before the shape is changed.

3. The numerical controller according to claim 1, further comprising a display that displays a result of the shape matching between the CAD shape information and the machining shape information.

4. The numerical controller according to claim 3, wherein a candidate for the change in shape is selectable in the display based on a difference between the CAD shape information and the machining shape information before the change obtained by analyzing the machining program before the change.

* * * * *